United States Patent [19]

Mirlocca

[11] Patent Number: 5,425,573
[45] Date of Patent: Jun. 20, 1995

[54] BRAKE FLUID DAMPENING MECHANISM AND SYSTEM THEREWITH

[75] Inventor: David Mirlocca, Tucson, Ariz.
[73] Assignee: Parallel Ventures Inc., Tucson, Ariz.
[21] Appl. No.: 253,617
[22] Filed: Jun. 3, 1994

Related U.S. Application Data

[63] Continuation of Ser. No. 14,408, Feb. 5, 1993, abandoned.
[51] Int. Cl.⁶ ............................................. B60T 17/00
[52] U.S. Cl. ......................................... 303/87; 138/30
[58] Field of Search ...................... 303/87; 138/30, 31

[56] References Cited

U.S. PATENT DOCUMENTS

| | | | |
|---|---|---|---|
| 2,132,952 | 10/1938 | Hewitt | 138/30 |
| 3,430,660 | 3/1969 | Mitton | 303/87 |
| 4,188,073 | 2/1980 | Ishikawa | 303/87 |
| 5,036,879 | 8/1991 | Ponci | 138/30 |
| 5,058,961 | 10/1991 | Mergenthaler | 303/87 |
| 5,074,625 | 12/1991 | Jones | 303/87 |

*Primary Examiner*—Matthew C. Graham
*Attorney, Agent, or Firm*—Mark E. Ogram; Ogram & Teplitz

[57] ABSTRACT

A dampening system for a hydraulic or braking fluid activated brake system. The system utilizes a bellows which is responsive to changes in the braking fluid pressure. Pressing on one end of the bellows is a spring which provides an initial quick response dampening to increases in the hydraulic pressure. This dampening action discourages the brakes from locking and hence provides an enhanced braking system.

34 Claims, 3 Drawing Sheets

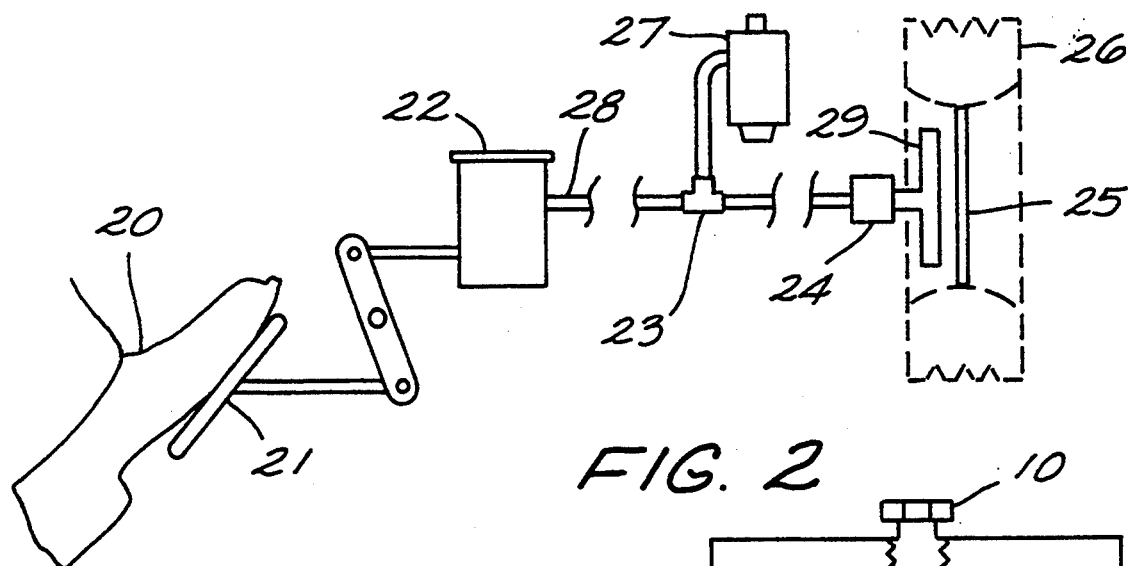
FIG. 2
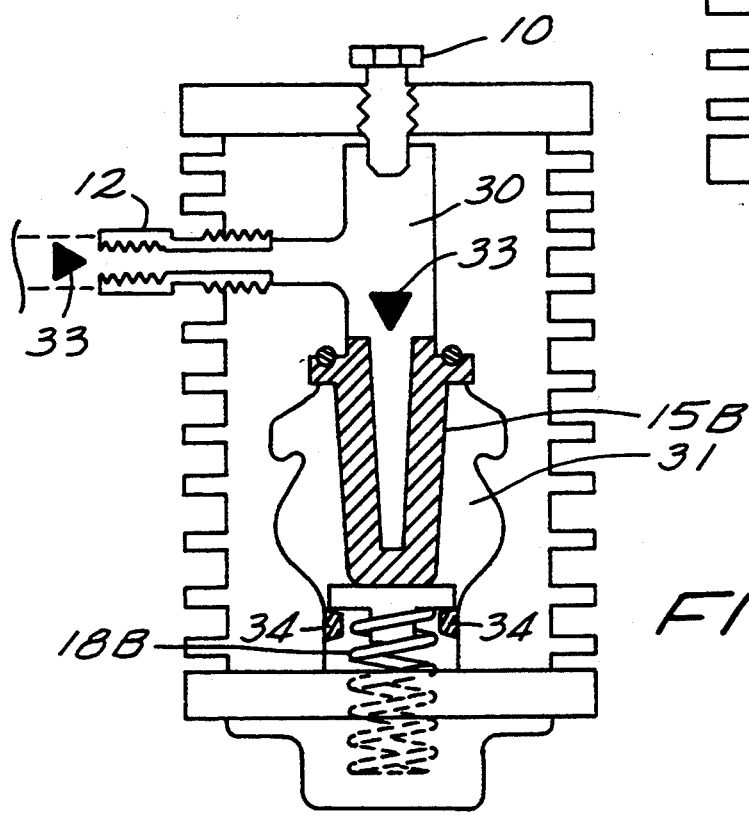
FIG. 3A
FIG. 3B

BRAKE FLUID DAMPENING MECHANISM AND SYSTEM THEREWITH

This is a continuation of application Ser. No. 08/014,408, filed on Feb. 5, 1993, and entitled "A Brake Fluid Dampening Mechanism and System Therewith", now abandoned.

BACKGROUND OF THE INVENTION

This invention relates generally to brake systems and more particularly to hydraulic brake systems.

Hydraulic brakes were developed and generally perfected around the Second World War when it became necessary for airplanes to land on relatively short runways. Shortly thereafter, hydraulic brakes were incorporated into a wide variety of vehicles including trucks, cars, and the like.

In a hydraulic braking system, a brake fluid, generally made out of a petroleum product, is communicated from a master cylinder to a brake. An operator manipulates the pressure of the brake fluid by depressing a brake pedal. This depression of the pedal creates an increase in the fluid pressure from the master cylinder which causes the brake to press against a drum or disc so as to absorb the kinetic energy of the wheel. This energy absorption additionally causes the wheel to resist movement relative to the roadway. The sum of these two activities is an absorption of the vehicle's momentum causing the vehicle to slow.

One anomaly which has been observed in this braking situation is that should the brake lock onto the drum or disc, then the absorption of the kinetic energy by the brake ceases and any energy which is absorbed is between the tire and the roadway. Unfortunately, the tire/roadway absorption is much less than the brake/drum absorption so once the brake/drum lock, the slowing capability of the vehicle decreases dramatically.

To cure this problem, a variety of devices have been developed such as elaborate anti-locking systems which actually pulse the hydraulic fluid. This pulsation assures that the brake/drum never have the capability of locking. These systems are expensive to build and install and generally cannot be added later to a vehicle as an aftermarket device.

It has been observed that the locking of the brake/drum occurs usually at the initial outset of the contact; that is, the brake is forced into the drum at such a high pressure that a natural bonding occurs. If the initial contact were dampened or decreased slightly, then the probability of locking occurring is diminished.

To this end, several devices have been developed which dampen the pressure build-up within the brake fluid line. These include U.S. Pat. No. 3,430,660, entitled "Pressure Equalizer Apparatus for Hydraulic Brake Fluid Systems" issued Mar. 4, 1969, to Mitton; and U.S. Pat. No. 5,074,625, entitled "Adjustable Pressure Variable Response Fluid Brake Systems Regulators" issued Dec. 24, 1991, to Jones; both of these patents are incorporated hereinto by reference.

In both of these devices, a rubber bellows arrangement is used. As the pressure within the braking fluid increases, the bellows expands into a chamber of a rigid body. Once the bellows has reached it maximum extension (as defined by the chamber), the full force of the hydraulic fluid is felt by the brake; but, at the initial outset, the bellows absorbs some of the pressure and thereby dampens the braking fluids affects.

Unfortunately, in both of these devices, it is the elasticity of the rubber which is the sole determining factor in the actual dampening obtained. This factor reduces the ability to accurately and minutely engineer devices which have differing dampening qualities to fit a vehicle's specific requirements.

It is clear from the foregoing that a need exists for an adjustable and more responsive hydraulic fluid dampener exists.

SUMMARY OF THE INVENTION

The present invention creates a dampening system for a hydraulic or braking fluid activated brake system. The system utilizes a bellows which is responsive to changes in the braking fluid pressure. Pressing on one end of the bellows is a spring which provides an initial quick response dampening to increases in the hydraulic pressure. This dampening action discourages the brakes from locking and hence provides an enhanced braking system.

The unit is capable of being put either in-line or as a dead-end extension for the hydraulic lines of the braking system. The only criteria is that the braking fluid from the brake system is communicated to the unit.

In the preferred embodiment of the invention, the unit employs a rubber bellows which is contained within a rigid body. The body contains a hollow portion in which the bellows is contained. The void within the bellows communicates with the braking fluid and expands or contracts depending on the pressure experienced by the bellows.

The second end of the bellows is pressured by a spring which tends to collapse the bellows. During the initial pressurization of the bellows, it is the spring which absorbs the pressurization energy.

Through the use of a stop mechanism, the depression of the spring is kept within tolerance so that the elasticity of the spring is not jeopardized during its depression. This limitation on the range of motion experienced by the spring does not limit the unit's capability as engineering modifications to the springs length, resilience, and other such factors easily obtain any desired initial dampening capabilities sought by the manufacturer. The stop mechanism of the unit relative to the spring is preferably obtained through a use of a collar which catches a plate interposed between the spring and the bellows. This collar prevents the plate from moving past a specified point and thereby defines the range of motion for the spring.

Once the spring has been fully depressed, the pressure of the braking fluid is further dampened by the expansion of the bellows into the hollow.

This arrangement provides for a two stage dampening process in which the spring acts an initial dampening mechanism and the rubber bellows acts a second stage dampening.

The invention, together with various embodiments thereof, will be more fully described by the following drawings and their accompanying descriptions.

DRAWINGS IN BRIEF

FIG. 2 is a functional layout illustrating the interaction of the embodiment of FIG. 1 with a vehicle's braking system.

Figure 3C:
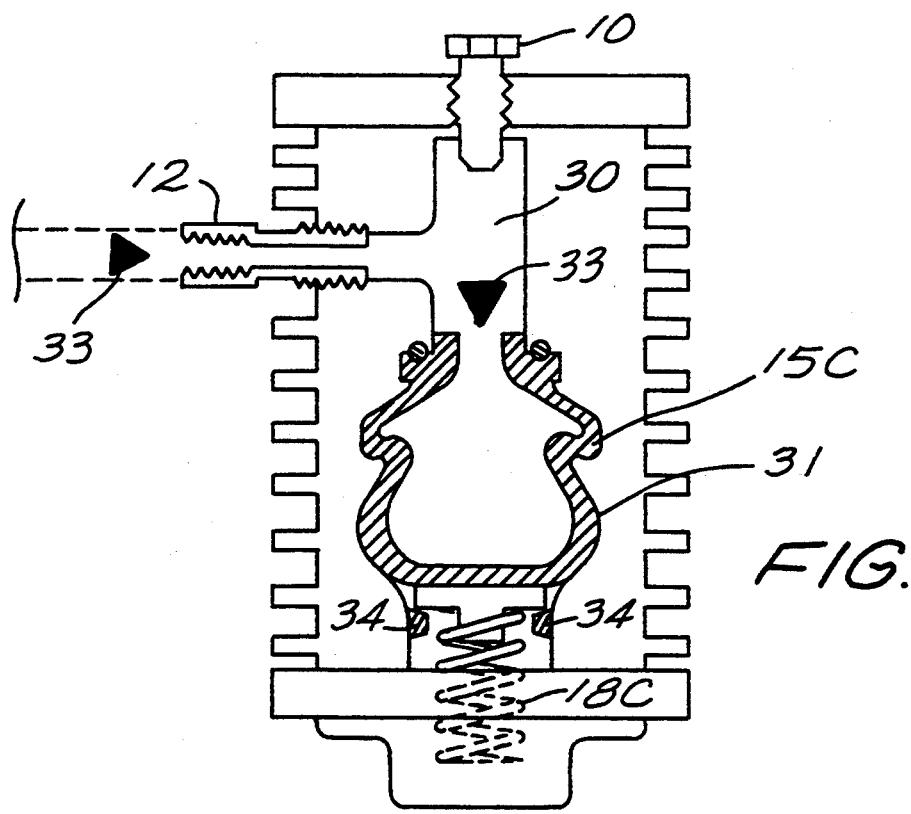

FIGS. 3A, 3B, and 3C are cut-away views of the preferred embodiment and illustrate the two stage dampening of the present invention.

Figure 4:
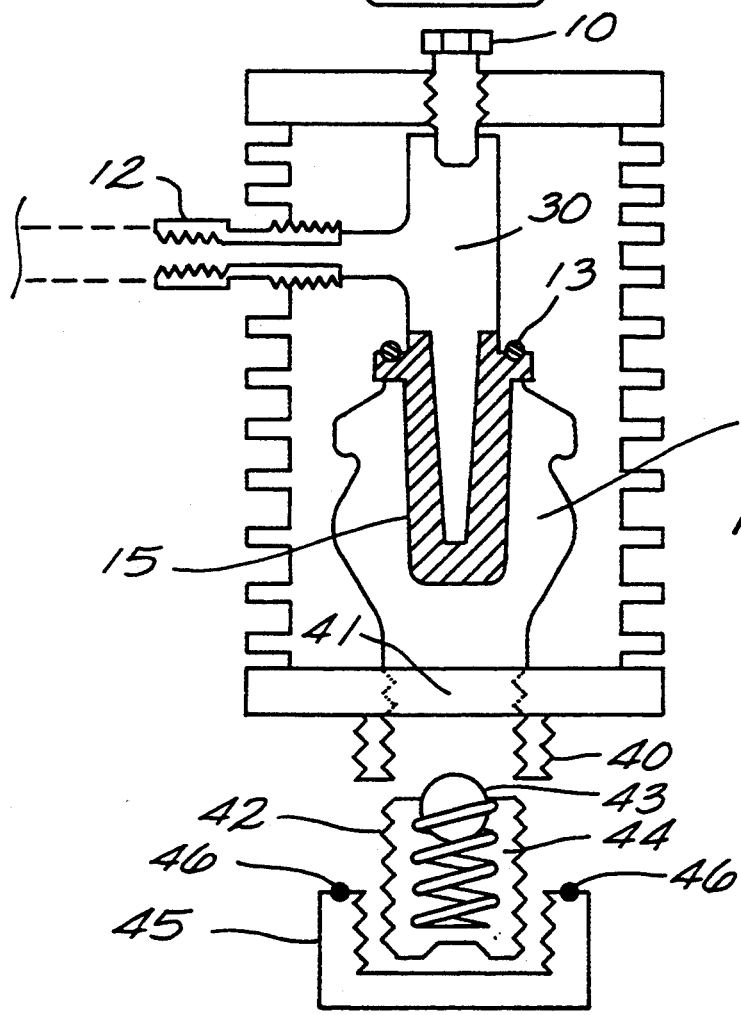

FIG. 4 is cut-away view of an alternative embodiment of the invention which permits the selective adjustment of the spring.

DRAWINGS IN DETAIL

Figure 1:
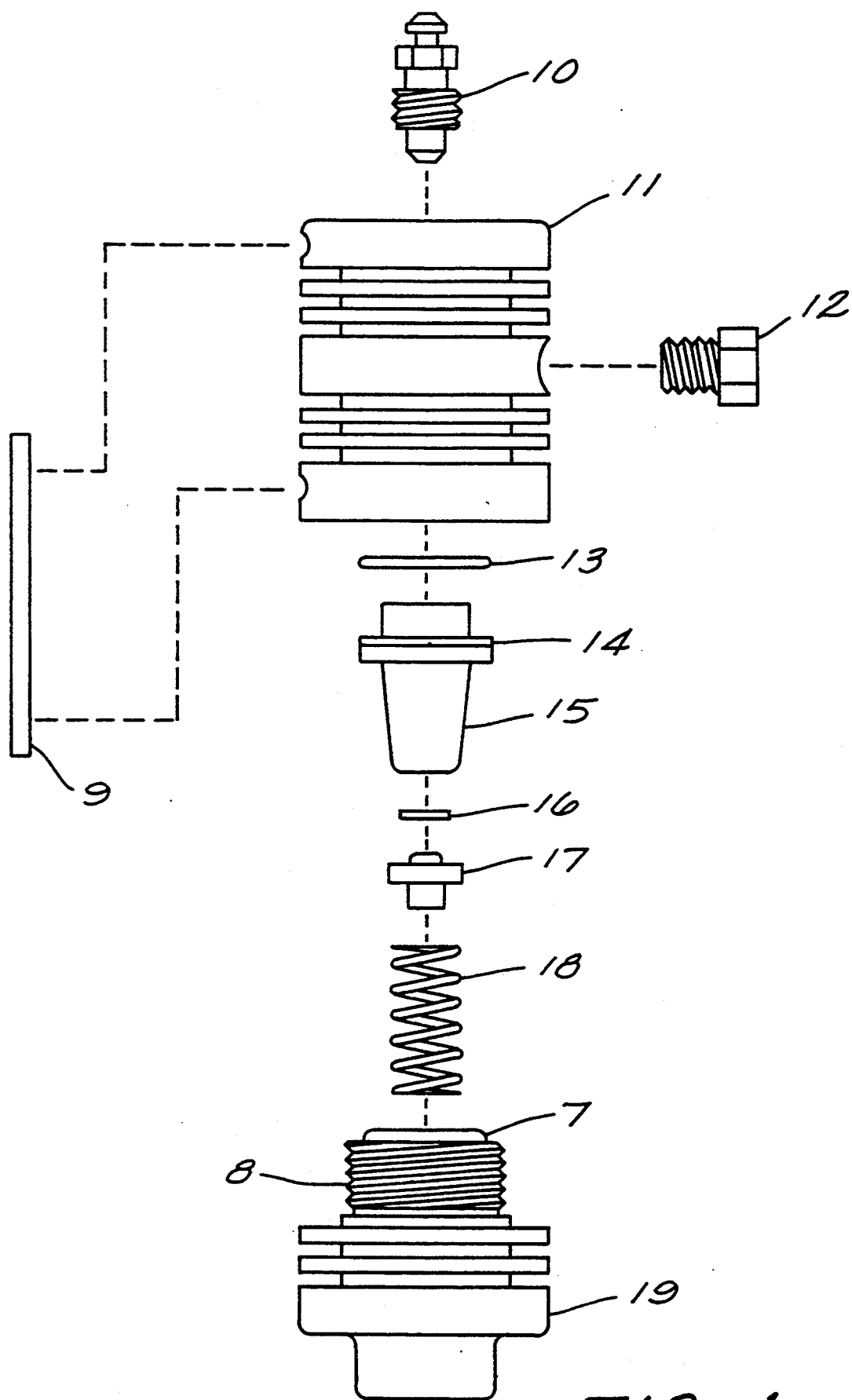
FIG. 1 is an exploded view of the preferred embodiment of the invention.

FIG. 1 is an exploded view of the preferred embodiment of the invention.

This embodiment employs two members making up the housing unit. First member 11 is secured to second member 19 via a screw mechanism 8.

Braking fluid is fed to the housing's first member 11 through attachment 12. Using a channel within the first member, not shown, the brake fluid is communicated to bleed valve 10 and also to the second member 19. Bleed valve 10 is used to remove air from the line so that only the braking fluid exists within the apparatus.

A hollow portion, not shown, exists in the second member 19 and is used to hold the components of: spring 18, seat 17, ring 16, and rubber bellows 15. This assemblage is pressed against the receiving portion of the first member 11 and secured by screw mechanism 8.

During this securing, lip 14 on rubber bellows 15 is sandwiched between O-ring 13 and lip 7 forming a tight seal therebetween. This seal prevents any of the braking fluid from escaping.

Because of the structure of second member 19, screw mechanism 8, O-ring 13, lip 14, and lip 7 and other components, a high level of sealing redundancy is obtain. This sealing redundancy permits the device to be fail safe since even if bellows 14 ruptures and permits braking fluid to leak therethrough, the escaping braking fluid would be caught and retained within the hollow portion and could not escape. This prevents the device from becoming a source of leakage which could cause the brake system to fail.

Bracket 9 is attached to the first member 11 and permits the entire assembly to be attached to the vehicle at any convenient location.

Note that this embodiment is considered a remote mount as the braking fluid flows to the unit but does not pass through. An alternative embodiment is structured to be an in-line unit permitting the braking fluid to easily flow through the unit from the master cylinder to the brakes. Those of ordinary skill in the art readily recognize how these pass through embodiments are constructed.

FIG. 2 is a functional layout illustrating the interaction of the dampening device of FIG. 1 with a vehicle's braking system.

In the typical braking system, an operator 20 provides mechanical pressure against pedal 21 which causes master cylinder 22 to create hydraulic pressure within line 28. In an unaltered state, this hydraulic pressure is communicated directly to brake mechanism 24 which presses brake plate 29 against plate 25 to absorb the kinetic energy of wheel 26.

For the present invention, T-coupling 23 permits the hydraulic fluid from hydraulic line 28 to feed the dampening device 27. Dampening device 27 is similar to the unit described relative to FIG. 1.

Note that dampening device 27 is placed at any location which is convenient and which permits access to hydraulic line 27.

As discussed earlier, when operator 20 causes the hydraulic pressure with line 20 to rise, dampening device 27 dampens this pressure rise; this dampening discourages brake plate 25 and brake plate 29 from locking together.

FIGS. 3A, 3B, and 3C are cut-away views of the preferred embodiment and illustrate the two stage dampening of the present invention.

FIG. 3A illustrates the device in an dormant state; that is, when the pressure within the braking system is minimal. As noted, the braking fluid is communicated via connector 12 to channel 30 which communicates the braking fluid to bleed valve 10 and also to bellows 15A.

Bellows 15A is contained within hollow 31 and is pressed by spring 18A. Spring 18A is in a relatively relaxed position in this state. Bellows 15A is sealed by O-ring 13 which presses against a lip on bellows 15A and is secured by bracket 32 which sandwiches the lip between O-Ring 13 and bracket 32. This arrangement produces a highly stable and secure seal.

As the pressure from the brake fluid increases, as illustrated by arrows 33, in FIG. 3B, the first dampening activity occurs with the depression of spring 18B. The depression of spring 18B is checked by stops 34 which catch on stop plate 17, preventing spring 18B from becoming fully depressed and affecting the spring's elasticity.

As the pressure continues, as shown in FIG. 3C, spring 18C does not compress further thereby encouraging bellows 15C to expand fully into hollow 31. This secondary dampening provides for even further dampening affects and further discourages brake lock.

As the pressure decreases, the dampening mechanism returns to a withdraw bellows, FIG. 3B, and then to a rest position, FIG. 3A. During the last state transition, from FIG. 3B to 3A, the spring provides added resilience by quickly forcing the hydraulic fluid from the bellows. This action increases the effectiveness of the apparatus.

FIG. 4 is cut-away view of an alternative embodiment of the invention which permits the selective adjustment of the spring.

This embodiment includes a threaded hole communicating with hollow 31. By inserting threaded spring mechanism 44 into this slot and through proper adjustment, ball connector 43 presses against the bottom of bellows 15 and provides the same sort of dampening action already discussed relative to the preferred embodiment of FIGS. 1, 2, and 3A-3C.

Threaded neck 40 permits cap 45, with associated O-ring 46, to be secured thereto and provide a sealing of hollow 31. Braking fluid which may escape during failure of bellows 15, does not escape but is secured within hollow 31.

It is clear from the foregoing that the present invention creates a new and improved dampening device which assists in discouraging the locking of brakes during activation of the braking system.

What is claimed is:

1. An anti-locking braking assist device for receiving braking fluid from a vehicle's braking system, said anti-locking braking assist device comprising:
    a) a first body member having,
        1) an input orifice for receipt of said braking fluid,
        2) a connecting orifice, and,
        3) channel means for communicating said braking fluid from said input orifice to said connector orifice;
    b) a second body member being secured to said first body section, said second body member having a hollow portion positioned such that upon securement of said second body member to said first body member, said hollow portion is in communication with said connecting orifice;

c) a bellows having an open first end and a second end, said bellows positioned in said hollow portion such that said open first end is in communication with said connecting orifice; and, d) spring means interposed between the second end of said bellows and second body member which applies a biasing force to cause an initial longitudinal expansion of said bellows against resilience of said spring means prior to a radial expansion of said bellows.

2. The anti-locking braking assist device according to claim 1 wherein said bellows includes a lip portion for sealing said bellows to a shoulder surrounding said connecting orifice by sandwiching said lip portion between said first body member and said second body member.

3. The anti-locking braking assist device according to claim 2 further including an O-ring extending around said shoulder for sealing said bellows to said first body member.

4. The anti-locking braking assist device according to claim 3 wherein the lip portion of said bellows is stiffened for pressing against said O-ring.

5. The anti-locking braking assist device according to claim 1 further including a force distribution plate member interposed between the spring means and the second end of said bellows, said force distribution plate member for distributing force from said spring across a flat surface of said second end of said bellows.

6. The anti-locking braking assist device according to claim 5 wherein said second body member includes a stop mechanism means positioned in said hollow portion, said stop mechanism means positioned to restrain the range of motion of said spring means.

7. The anti-locking braking assist device according to claim 6 wherein said stop mechanism means secures said force distribution plate member from movement past a specific point in said hollow portion.

8. The anti-locking braking assist device according to claim 7 wherein said specific point is selected to prevent damage to said spring due to excessive compression of said spring.

9. The anti-locking braking assist device according to claim 1 wherein said second body member includes an insertion opening for insertion of said spring means, and further including means for securing said spring means within said second body member.

10. The anti-locking braking assist device according to claim 9 wherein said means for securing said spring means includes means for selectively adjusting tension of said spring means against the second end of said bellows for allowing adjustment of damping characteristics of the anti-locking braking assist device.

11. The anti-locking braking assist device according to claim 10 wherein said second body member includes a threaded neck encircling the insertion opening and further including a threaded cap being sealable to said second body member via said threaded neck.

12. The anti-locking braking assist device according to claim 10 wherein tension of said spring is chosen to be less than elasticity of said bellows such that said spring means compresses prior to any radial expansion of said bellows.

13. An apparatus for assisting a braking system using braking fluid, said apparatus comprising:

a) a body member having,
  1) an input orifice for receipt of said braking fluid,
  2) a hollow portion contained within said body member, and,
  3) channel means for communicating said braking fluid from said input orifice to said hollow portion;

b) a bellows having an open first end and a second end, said bellows positioned in said hollow portion such that said open first end is in communication with said channel means; and, c) spring means interposed between the second end of said bellows and said body member which applies a biasing force to cause an initial longitudinal expansion of said bellows against resilience of said spring means prior to a radial expansion of said bellows.

14. The apparatus according to claim 13 wherein said bellows includes a lip portion for sealing the first end of said bellows to said body member.

15. The apparatus according to claim 14 further including an O-ring extending around said shoulder for sealing said bellows to said body member.

16. The apparatus according to claim 15 wherein the lip portion of said bellows is stiffened for pressing against said O-ring.

17. The apparatus according to claim 13 further including a force distribution member interposed between the spring means and the second end of said bellows, said force distribution member for distributing force from said spring across a flat surface of the second end of said bellows.

18. The apparatus according to claim 17 wherein said body member includes a stop mechanism means positioned in said hollow portion, said stop mechanism means positioned to restrain the range of motion of said spring means.

19. The apparatus according to claim 18 wherein said stop mechanism means secures said force distribution mechanism from movement past a specific point in said hollow portion.

20. The apparatus according to claim 19 wherein said specific point is selected to prevent damage to said spring due to excessive compression of said spring.

21. The apparatus according to claim 13 wherein said body member includes an insertion opening for insertion of said spring means, and further including means for securing said spring means within said body member.

22. The apparatus according to claim 21 wherein said means for securing said spring means includes means for selectively adjusting tension of said spring means against the second end of said bellows for allowing adjustment of damping characteristics of the anti-locking braking assist device.

23. The apparatus according to claim 22 wherein said second body member includes a threaded neck encircling the insertion opening and further including a threaded cap being sealable to said body member via said threaded neck.

24. A braking system comprising:

a) a braking cylinder being responsive to operator activation for creating changes in pressure of a braking fluid;

b) a brake attached to a vehicle, said brake being responsive to changes in pressure of said braking fluid; and, c) a braking assist device receiving said braking fluid and having,
1) a body member having,
A) an input orifice for receipt of said braking fluid,
B) a hollow portion contained within said body member, and,
C) channel means for communicating said braking fluid from said input orifice to said hollow portion,
2) a bellows having an open first end and a second end, said bellows positioned in said hollow portion such that said open first end is in communication with said channel means, and,
3) spring means interposed between the second end of said bellows and said body member which applies a biasing force to cause an initial longitudinal expansion of said bellows against resilience of said spring means prior to a radial expansion of said bellows.

25. The braking system according to claim 24 wherein said bellows includes a lip portion for sealing the first end of said bellows to said body member.

26. The braking system according to claim 25 further including an O-ring extending around said shoulder for sealing said bellows to said body member.

27. The braking system according to claim 26 wherein the lip portion of said bellows is stiffened for pressing against said O-ring.

28. The braking system according to claim 24 further including a force distribution member interposed between the spring means and the second end of said bellows, said force distribution member for distributing force from said spring across a flat surface of the second end of said bellows.

29. The braking system according to claim 28 wherein said body member includes a stop mechanism means positioned in said hollow portion, said stop mechanism means positioned to restrain the range of motion of said spring means.

30. The braking system according to claim 29 wherein said stop mechanism means secures said force distribution mechanism from movement past a specific point in said hollow portion.

31. The braking system according to claim 30 wherein said specific point is selected to prevent damage to said spring due to excessive compression of said spring.

32. The braking system according to claim 24 wherein said body member includes an insertion opening for insertion of said spring means, and further including means for securing said spring means within said body member.

33. The braking system according to claim 32 wherein said means for securing said spring means includes means for selectively adjusting tension of said spring means against the second end of said bellows for allowing adjustment of damping characteristics of the anti-locking braking assist device.

34. The braking system according to claim 33 wherein said second body member includes a threaded neck encircling the insertion opening and further including a threaded cap being sealable to said body member via said threaded neck.

* * * * *